United States Patent Office 3,069,093
Patented Dec. 18, 1962

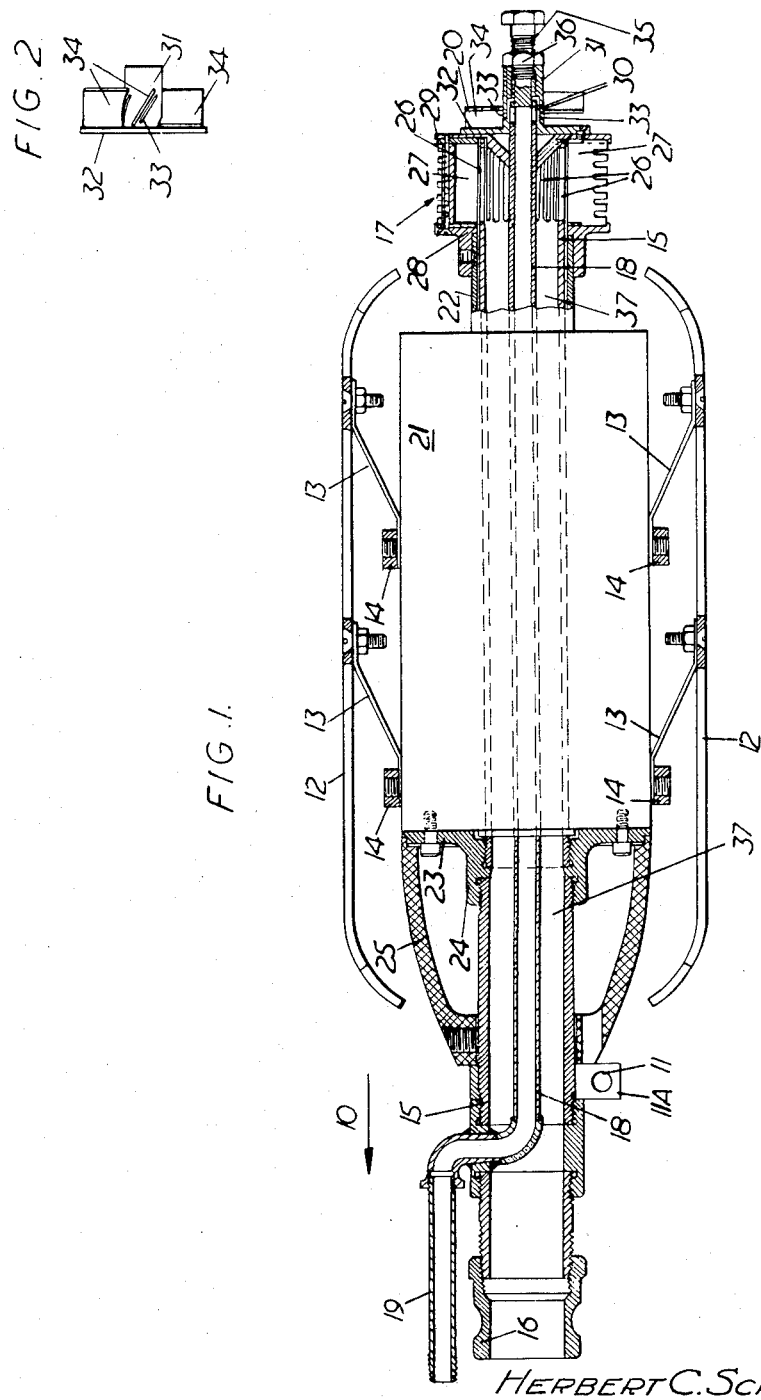

3,069,093
LINING OF PIPES INCLUDING MULTIPLE HEAD LINING MACHINE
Herbert C. Schultz, Wyckoff, N.J., assignor, by mesne assignments, to Raymond International Inc., New York, N.Y., a corporation of New Jersey
Filed May 4, 1960, Ser. No. 26,899
Claims priority, application Great Britain July 31, 1959
3 Claims. (Cl. 239—215)

This invention relates to a machine for applying linings to pipes and, in particular, to pipes of relatively small diameters.

It is known to apply a lining to the internal surface of a pipe by spraying cement-mortar onto it from a rotating head. In the known process the head is slowly progressed through the pipe, leaving a cement-mortar coating behind it, and this may be smoothed by one or more rotating trowel members, which, since the machine moves backwards through the pipe, follow close behind the rotating head. The application of the mortar to the wall of the pipe has usually been effected by forcing the plastic mortar through a pipe co-axial with the head and having a number of parallel longitudinal slots therein, through which the mortar issues. The mortar is then thrown outwards by means of a rapidly rotating head comprising a number, for example, twenty four, radially placed plates held in end discs. These plates preferably have slotted edges.

It is an object of the present invention to provide a machine for applying improved linings to pipes and, in particular, to pipes of relatively small diameters.

According to the present invention, a machine for applying lining to a pipe is arranged to be progressed through the pipe by means of a tow-cable and comprises first and second rotatable distributor heads, means for rotating the distributor heads at high speed, first and second conduits for receiving fluent lining material from a source outside the pipe and arranged to feed the material to the first and second distributor heads, respectively, the first head being located closely ahead of the second head to apply a lining which is thereafter covered by a lining applied by the second head.

Preferably, the machine comprises a generally torpedo-shaped body, said first conduit extends axially through the body to said first distributor head which is located at the trailing end of the body, and said second conduit extends into and coaxially through said first conduit and said first distributor head to said second distributor head.

An embodiment of the invention will now be described, by way of example, with reference to the accompanying drawings in which:

FIG. 1 is an elevation, largely in section, of a machine for applying a two-layer lining to a pipe of relatively small diameter; and, FIG. 2 is a fragmentary view showing, in elevation, one of the two distributor heads of the machine.

Referring to the drawings, the machine is arranged to be progressed in the direction of arrow 10 through a pipe to which lining is to be applied, by means of a tow-cable attached to an eye 11 and wound onto a winch outside the pipe.

The machine has a generally torpedo-shaped body, and four hardened runners or skids 12 mounted on springs 13 are secured to the body by means of metal bands 14. The skids which engage the unlined pipe wall to maintain the machine substantially coaxial within the pipe, are detachable and the runners and springs may be replaced to adapt the machine for use in pipes having diameters over a range of sizes.

A pipe or conduit 15 extends from a connector 16 axially through the body of the machine to a first distributor head 17 at the rear of the machine. A second pipe or conduit 18 extends from a connector 19 into and through the pipe 15 to a second distributor head 20 fixed to the rear of the head 17. The head 17 with the head 20 secured thereto, is driven at high speed by an electric motor 21 through a tubular drive shaft 22. The motor is of the synchronous type having its field coils arranged concentrically around the pipe 15 and at the forward end is secured to the pipe by means of an annular flange 23. The pipe 15 is in lengths two of which are interconnected by a double socket 24 which forms an inward extension of flange 23. A cup-shaped fairing 25 encloses the flange and the socket and a ring 11A which provides the towing eye 11 is clamped in front of the fairing.

The rear end of the pipe 15 is formed with a series of slots 26 providing openings to the distributor head 17 which comprises a series of radial plates 27 slotted or serrated at their outer edges and clamped between plates 28 and 29. The front plate 28 extends forwardly as a socket in which is fixed the drive shaft 22. The rear plate 29 extends inwardly to surround pipe 18 in a running fit.

The rear end of pipe 18 is formed with a series of slots 30 which provide openings to the distributor head 20. The head 20 comprises a tubular body 31 secured to plate 29 of head 17 by means of an integral flange 32, and formed with four slots 33 and four radial blades 34 which are arranged at an acute angle to the machine axis as are propeller blades. A slot is located alongside the root of each blade. An adjuster screw 35 which extends into pipe 18 to control the opening from slots 30 is located in the body 31 and provided with a locknut 36. The screw 35 also acts to close the rear end of body 31.

In operation, fluent cement-mortar lining material is fed under pressure through a flexible pipe (not shown) from a source outside the pipe being lined, to connector 16. The material flows rearwardly through pipe 15, passing through the annular channel 37 between pipes 15 and 18. On reaching the rear end of pipe 15 the material is forced through the slots 26 and is thrown outwardly by head 17 to form a first layer of lining on the pipe wall. Simultaneously, liquid bituminous material is fed under pressure through a second flexible pipe (not shown) from a second source outside the pipe being lined, to connector 19. The bituminous material flows rearwardly through pipe 18, is forced through slots 30, and is then thrown outwardly and, due to the propeller-like form of the blades 34, rearwardly by head 20 to form a second layer of lining on the pipe wall. It has been found that the acute angling of the blades acts to prevent intermixing of the two lining materials.

Thus, the pipe is lined with a double layer which comprises cement-mortar which may be from $\frac{1}{16}$ to $\frac{1}{4}$ inch thick sealed with bituminous material which may be from 2 to 25 millimeters thick, the thicknesses being controlled in accordance wth the size and other requirements of the pipe being lined. In pipes of relatively small diameter, trowel members are not essential for smoothing a lining of cement-mortar, and the sealing layer of bituminous material provides the lining with a surface which is very satisfactorily smooth. This is particularly true when bituminous emulsions are used. It will be understood that the lining materials are chosen to meet the requirements of the pipe being lined and need not be the combination as specified above; for instance, the sealing layer may be a plastic or another material which is virtually inert to the fluids which will flow through the pipe. The form of the distributor heads will be chosen to suit the respective lining materials.

Furthermore, the invention is not restricted to a machine for applying only two layers of lining materials, as additional distributor heads can be incorporated to effect the application of multiple layers of lining material.

What is claimed and desired to be secured by Letters Patent is:

1. In a machine for applying lining to a pipe and including first and second distributor heads mounted for rotation about a common axis, means delivering fluent material to each of said heads, means for rotating said heads so that said fluent material is distributed therefrom by centrifugal force towards the pipe wall, the improvement that comprises; a plurality of radially extending blades positioned on each head for engaging the fluent material emanating from its respective head and directing same outwardly therefrom, the degree of twist or angularity of the blades of one of said heads relatively to the axis of rotation differing substantially from that of the blades of the other head and in a direction tending to keep separate the material emanating from each head while in transit between the heads and the pipe wall.

2. A machine as claimed in claim 1, in which said second distributor head comprises a tubular body open at the front end to receive such fluent lining material, said tubular body being closed at the rear end and formed with openings for radial outflow of the lining material, each radially extending blade being positioned with the root thereof substantially alongside its respective opening, said openings and blades being disposed at an acute angle to the machine axis.

3. A machine as claimed in claim 1 wherein the diameter of said first distributor head is greater than that of the second head thereby to produce a greater peripheral velocity of said first head as compared to that of said second head, thereby responsive to rotation of said heads and to the advancing of the machine through the pipe producing flow paths of lining material from said first head to the pipe interior which is closer to a radius vertical to the axis of rotation than the flow path of said material from said second head, and thereby tending to separate said two flow paths while the material is in transit to such pipe interior.

References Cited in the file of this patent

UNITED STATES PATENTS

| | | |
|---|---|---|
| 1,988,329 | Perkins | Jan. 15, 1935 |
| 2,168,917 | Perkins | Aug. 8, 1939 |
| 2,262,647 | Perkins | Nov. 11, 1941 |
| 2,287,448 | Perkins | June 23, 1942 |
| 2,758,352 | Perkins | Aug. 14, 1956 |
| 2,895,449 | Oldfield | July 21, 1959 |
| 2,922,583 | Perkins | Jan. 26, 1960 |